(12) United States Patent
Kuzdzal

(10) Patent No.: US 6,547,037 B2
(45) Date of Patent: Apr. 15, 2003

(54) HYDRATE REDUCING AND LUBRICATION SYSTEM AND METHOD FOR A FLUID FLOW SYSTEM

(75) Inventor: Mark Joseph Kuzdzal, Allegeny, NY (US)

(73) Assignee: Dresser-Rand Company, Olean, NY (US)

( * ) Notice: Subject to any disclaimer, the term of this patent is extended or adjusted under 35 U.S.C. 154(b) by 0 days.

(21) Appl. No.: 09/854,822

(22) Filed: May 14, 2001

(65) Prior Publication Data

US 2002/0166729 A1 Nov. 14, 2002

(51) Int. Cl.[7] ................................................. F01M 1/10
(52) U.S. Cl. ..................................... 184/6.24; 184/6.21
(58) Field of Search ............................... 184/6.21, 6.24, 184/26, 49

(56) References Cited

U.S. PATENT DOCUMENTS

| | | | |
|---|---|---|---|
| 2,423,436 A | | 7/1947 | Blom |
| 4,084,925 A | | 4/1978 | Stroud et al. |
| 4,093,578 A | * | 6/1978 | Vasiliev et al. ............. 427/375 |
| 4,830,745 A | * | 5/1989 | van der Meulen ......... 184/6.24 |
| 5,150,975 A | | 9/1992 | Major et al. |
| 5,264,005 A | * | 11/1993 | Blythe ......................... 44/388 |
| 5,334,329 A | * | 8/1994 | Vinci et al. .................. 508/192 |
| 5,663,130 A | | 9/1997 | Emert et al. ................. 508/465 |
| 5,674,057 A | | 10/1997 | Guardiani et al. |
| 5,765,639 A | | 6/1998 | Muth |
| 5,795,135 A | | 8/1998 | Nyilas et al. |
| 5,934,372 A | | 8/1999 | Muth |
| 5,981,447 A | * | 11/1999 | Chang et al. ................ 166/295 |
| 5,992,517 A | | 11/1999 | McAnally |
| 6,022,929 A | * | 2/2000 | Chen et al. ............... 525/327.9 |
| 6,082,118 A | * | 7/2000 | Endrizzi et al. ............... 585/15 |
| 6,207,624 B1 | * | 3/2001 | Stachew et al. ............ 508/290 |

* cited by examiner

*Primary Examiner*—David Fenstermacher
(74) *Attorney, Agent, or Firm*—Haynes and Boone, LLP

(57) ABSTRACT

A system and method for lubricating fluid flow apparatus utilizing a hydrate-reducing chemical.

12 Claims, 1 Drawing Sheet

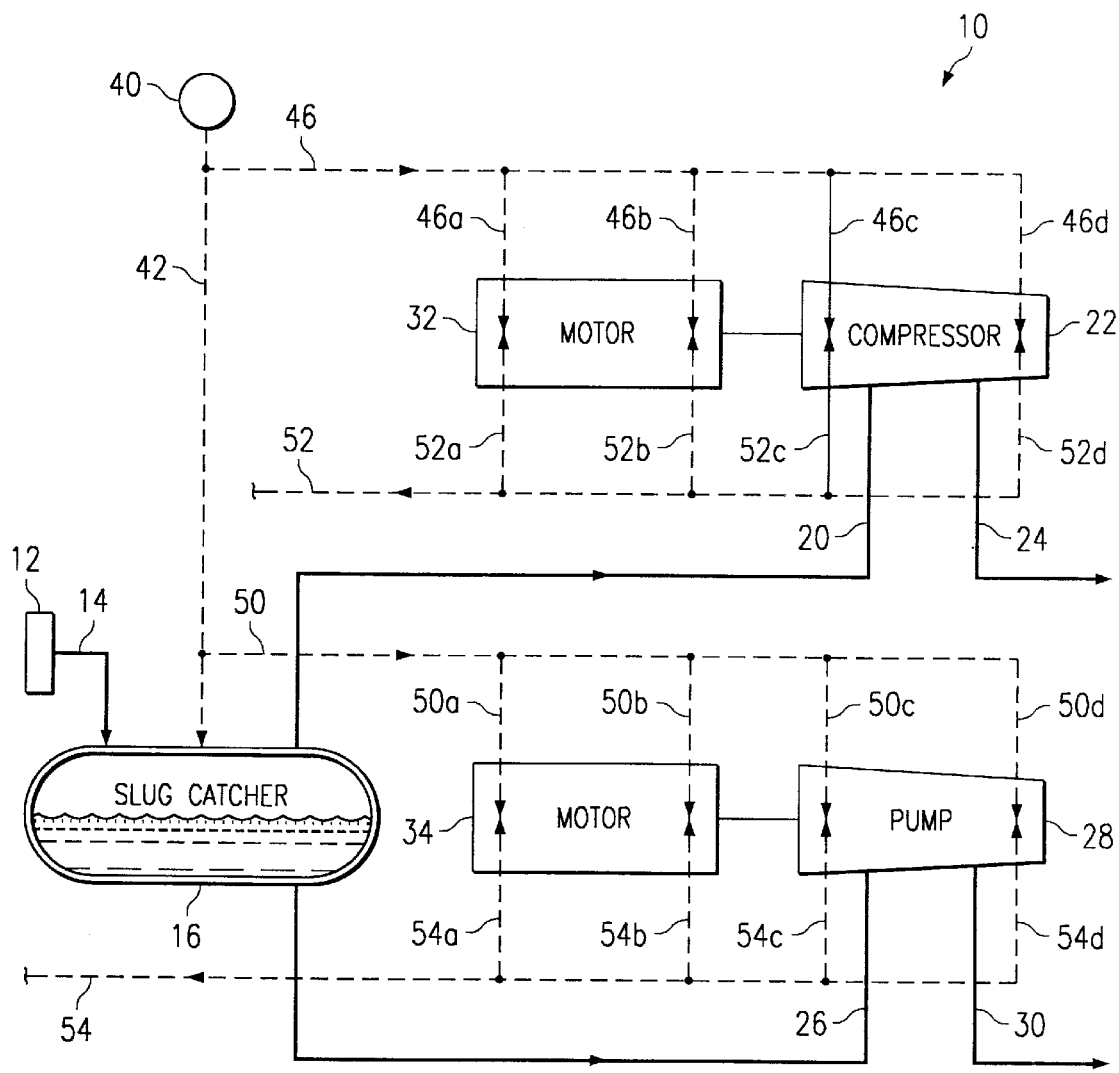

HYDRATE REDUCING AND LUBRICATION SYSTEM AND METHOD FOR A FLUID FLOW SYSTEM

BACKGROUND

This invention relates to a hydrate reducing and lubrication system and method for a fluid flow system.

In large fluid processing systems, heavy machinery, including pumps, compressors, and motors, are utilized. This equipment, of course, has components, such as bearings and seals, that have to be lubricated. Oil, or oil based products, are often used as a lubricant, which is expensive and requires additional equipment, such as coolers and pumps. Moreover, any oil that leaks past the seals and bearings of the equipment has to be reclaimed, which further adds to the costs. These problems are especially acute in connection with subsea, or offshore, oil and gas recovery systems, since the lubricants have to be transported from land to the offshore system and stored in relatively large vessels.

Therefore, what is need is a lubrication system for machinery of the above type which eliminates the need for oil and the above attendant problems.

SUMMARY

According to the system and method of the present invention, a hydrate-reducing chemical is passed into at least a portion of the equipment for lubricating same.

BRIEF DESCRIPTION OF THE DRAWINGS

The drawing is an diagrammatic view of a system according to an embodiment of the present invention.

DETAILED DESCRIPTION

An embodiment of the present invention will be described in connection with a hydrocarbon recovery system, shown, in general by the reference numeral 10. The system 10 is designed to recover hydrocarbon fluid, such as oil and gas, from a well 12, and, to this end, one end of a conduit 14 extends from the well for transporting the recovered fluid from the well. A slug catcher 16 is connected to the other end of the conduit 14 for removing foreign matter, such as rock and sand, from the recovered fluid. In the slug catcher 16, the gaseous portion of the recovered fluid rises to the upper portion of the slug catcher, and the liquid portion descends to the lower portion thereof.

A conduit 20 extends from the upper portion of the slug catcher 16 for transporting the separated gas to the inlet of a compressor 22 for passing the gas to an outlet conduit 24 that extends from the outlet of the compressor. The gas passes, via the conduit, 24 to storage facilities, or the like.

Similarly, one end of a conduit 26 is connected to the lower portion of the slug catcher 16, and a pump 28 is connected to the other end of the conduit for pumping the separated liquid through the conduit 26 and to an outlet conduit 30 extending from the outlet of the pump 28. The liquid passes, via the conduit 30, to storage facilities, or the like. It is understood that the recovered gas and liquid can be combined after they exit the compressor 22 and the pump 28, respectively, and before they are stored. Two motors 32 and 34 are operatively connected to the compressor 22 and to the pump 28, respectively, for driving them.

A tank 40 is provided which contains a chemical to minimize and or eliminate hydrate formation in the conduits 20, 24, 26, and 30, the compressor 22, and the pump 28 during the above-described operation. A non-limitative example of this chemical is a monoethylene gycol (MEG). A conduit 42 extends from the storage tank 40 to the slug catcher 16 for transporting the MEG to the slug catcher where it mixes with the recovered gas and liquid. The MEG, with the gas and liquid, then passes, via the conduits 20 and 26, to the compressor 22 and the pump 28, respectively, before it is discharged, with the gas and liquid, to the conduits 24 and 30, respectively for passage to the storage facilities.

A conduit 46 extends from the conduit 42 and branches into four branch conduits 46a, 46b, 46c, and 46d which extend to two inlets in the motor 32 and two inlets in the compressor 22, respectively. These inlets are in communication with the bearings and seals of the compressor 22 and the motor 32, and normally receive oil for lubricating the bearings and the seals. However, the need for oil is eliminated since the MEG performs the lubricating function.

Similarly, a conduit 50 extends from the conduit 42 downstream of the conduit 46 and branches into four branch conduits 50a, 50b, 50c, and 50d which extend to two inlets in the motor 34 and two inlets in the pump 28, respectively. These inlets are in communication with the bearings and seals of the pump 28 and the motor 34, and normally receive oil for lubricating the bearings and the seals. However, the need for oil is eliminated since the MEG lubricates the pump 28 and the motor 34.

A discharge line 52 is connected to the lubrication outlets of the motor 32 and the compressor 22, via branch conduits 52a, 52b, 52c, and 52d, respectively. Also, a discharge line 54 is connected to the lubrication outlets of the motor 34 and the pump 28, via branch conduits 54a, 54b, 54c, and 54d, respectively. It is understood that the discharge lines 52 and 54 can be connected to the slug catcher 16, the well head, or any ancillary equipment.

It is understood that a booster pump, or the like, can be provided in the conduits 42, 46, 50, 52 and 54 as needed to pump the MEG in the manners discussed above.

Thus, according to the above embodiment, the MEG functions to both lubricate the compressor 22 the pump 28, and their motors 32 and 34; as well as reduce hydrate formation in the conduits 20, 24, 26, and 30, the compressor 22, and the pump 28. Thus the need for oil lubrication of the compressor 22, the pump 28, and the motors 32 and 34 is eliminated. Also, any of the MEG that leaks past the bearings and/or seals of the above components does not need to be reclaimed since it can be discharged back into the compressor 22 and/or the pump 28. Moreover, the above embodiment eliminates the need for additional storage facilities, or associated equipment that is required when oil is used as a lubricant.

It is understood that variations may be made in the foregoing without departing from the scope of the invention. For example, the above embodiment is not limited to oil and gas applications but is equally applicable to any application in which it is desirable to use a chemical, such as MEG, to minimize and or eliminate hydrate formation in the conduits and/or equipment. Also, the above references to "conduit" are not meant to be limited to any particular fluid flow device, such as hoses, tubes, and the like, and any such device or devices can be used throughout the system. Further, the system and method of the present invention are not limited to use with pumps, compressors and motors, but is equally applicable to any other similar type of equipment.

Since other modifications, changes, and substitutions are intended in the foregoing disclosure, it is appropriate that the appended claims be construed broadly and in a manner consistent with the scope of the invention.

What is claimed is:

1. A hydrocarbon recovery method comprising recovering a mixture of oil and gas from a well; separating the oil from the gas; transferring the separated gas to a first unit for compressing the gas; activating the first unit for compressing the gas; transferring the separated oil to a second unit for pumping the oil; activating the second unit for pumping the oil; mixing a first quantity of a chemical with the mixture to minimize hydrate formation during the steps of transferring, compressing, and pumping; and passing a second quantity of the chemical to the units for lubricating the units.

2. The method of claim 1 wherein the second quantity of the chemical is passed into the units through lubrication inlets provided in the units.

3. The method of claim 1 further comprising discharging the second quantity of the chemical from lubrication outlets provided in the units after the chemical has lubricated the units, and passing the discharged chemical to external equipment.

4. The method of claim 1 further comprising separating foreign matter from the mixture before the step of separating.

5. The method of claim 1 wherein the chemical is monoethylene glycol.

6. The method of claim 1 wherein the unit is a pump and/or compressor.

7. The method of claim 1 wherein a portion of the first quantity of the chemical is transferred with the gas to the first unit, and wherein another portion of the first quantity of the chemical is transferred with the oil to the second unit.

8. The method of claim 1 further comprising coupling a motor to each unit for driving same, and passing a third quantity of the chemical to the motors for lubricating the motors.

9. A hydrocarbon recovery system comprising a separator for receiving a mixture of oil and gas and separating the oil from the gas; a first unit for compressing the gas; a conduit connecting the separator to the first unit to transfer the gas to the first unit for compressing the gas, a second unit for pumping the oil; a conduit connecting the separator to the second unit to transfer the oil to the second unit for pumping the oil; a conduit for passing a first quantity of a chemical to the mixture so that the chemical passes with the oil and the gas through the conduits and to the first and second units, respectively, to minimize hydrate formation in the conduits and the units; and a conduit for passing a second quantity of the chemical to the units for lubricating the unit.

10. The system of claim 9 wherein the first unit has a first inlet for receiving the mixture of gas and the chemical, and a second inlet for receiving the chemical; and wherein the second unit has a first inlet for receiving the mixture of oil and the chemical, and a second inlet for receiving the chemical.

11. The system of claim 9 further comprising conduits for discharging the chemical from outlets provided in the units after the chemical has lubricated the units and for passing the discharged chemical to external equipment.

12. The system of claim 9 further comprising a motor coupled to each unit for driving same, and a conduit for passing a third quantity of the chemical to the motors for lubricating the motors.

* * * * *